(12) United States Patent
Nakamura

(10) Patent No.: US 8,985,096 B2
(45) Date of Patent: Mar. 24, 2015

(54) HEAT EXCHANGING STRUCTURE INCLUDING SOLAR HEAT CONVERTER

(75) Inventor: Katsushige Nakamura, Chofu (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 992 days.

(21) Appl. No.: 13/010,911

(22) Filed: Jan. 21, 2011

(65) Prior Publication Data

US 2011/0114082 A1 May 19, 2011

(51) Int. Cl.
*F24J 2/30* (2006.01)
*F24J 2/07* (2006.01)
*F24J 2/10* (2006.01)
*F24J 2/18* (2006.01)

(52) U.S. Cl.
CPC .... *F24J 2/07* (2013.01); *F24J 2/10* (2013.01); *F24J 2/18* (2013.01); *Y02E 10/41* (2013.01)
USPC ........... 126/643; 126/438; 126/419; 126/270; 126/450; 126/651; 165/10

(58) Field of Classification Search
USPC .......................... 126/643.7, 438, 271; 60/641; 136/89 CC, 89 PP; 165/10
See application file for complete search history.

(56) References Cited

U.S. PATENT DOCUMENTS

| | | | | | |
|---|---|---|---|---|---|
| 1,696,003 | A | * | 12/1928 | Harvey | 126/585 |
| 4,033,118 | A | * | 7/1977 | Powell | 60/641.15 |
| 4,053,326 | A | * | 10/1977 | Forrat | 136/256 |
| 4,088,120 | A | * | 5/1978 | Anderson | 126/573 |
| 4,111,189 | A | * | 9/1978 | Dizon | 126/400 |
| 4,131,485 | A | * | 12/1978 | Meinel et al. | 136/259 |
| 4,263,895 | A | * | 4/1981 | Colao | 126/586 |
| 4,265,224 | A | * | 5/1981 | Meyer | 126/572 |
| 4,402,306 | A | * | 9/1983 | McElroy, Jr. | 126/619 |
| 4,407,268 | A | * | 10/1983 | Jardin | 126/618 |
| 4,452,232 | A | * | 6/1984 | David | 126/587 |
| 4,479,485 | A | * | 10/1984 | McDougal et al. | 126/648 |
| 4,546,758 | A | * | 10/1985 | Ebernard | 126/635 |
| 4,619,244 | A | * | 10/1986 | Marks | 126/680 |
| 4,627,418 | A | * | 12/1986 | Gibson et al. | 126/683 |
| 4,830,092 | A | * | 5/1989 | Lee | 165/10 |

(Continued)

FOREIGN PATENT DOCUMENTS

CN 201425380 3/2010
CN 101924497 12/2010

(Continued)

OTHER PUBLICATIONS

China Office action, mail date is Dec. 25, 2013.

Primary Examiner — Steven B McAllister
Assistant Examiner — Nikhil Mashruwala
(74) Attorney, Agent, or Firm — Greenblum & Bernstein, P.L.C.

(57) ABSTRACT

A heat exchanging structure of a solar heat exchanger 3 includes a housing 5 and a pipe 11. The solar heat exchanger includes a heat-resistant container 8 having an open top and containing a low-melting-point metal 9 and a light receiving plate 10. The housing accommodates the solar heat exchanger. The pipe passes a heat carrier H. The pipe is arranged in a space between the housing and the solar heat exchanger in such a way as not to touch the solar heat exchanger. The heat carrier is surely heated by radiant heat from the solar heat exchanger that is heated to very high temperatures. The light receiving plate has a container-like shape having an open top, and therefore, has a large light receiving area to heat itself to higher temperatures compared with a flat light receiving plate.

4 Claims, 2 Drawing Sheets

(56) References Cited

U.S. PATENT DOCUMENTS

| | | | | |
|---|---|---|---|---|
| 5,167,218 | A * | 12/1992 | Deakin | 126/569 |
| 6,230,444 | B1 * | 5/2001 | Pause | 52/1 |
| 7,077,124 | B2 * | 7/2006 | Szymocha | 126/643 |
| 2010/0206298 | A1 * | 8/2010 | Karni | 126/651 |
| 2011/0253128 | A1 * | 10/2011 | Nakamura | 126/645 |

FOREIGN PATENT DOCUMENTS

| | | |
|---|---|---|
| JP | 63-169444 | 7/1988 |
| JP | 11-119105 A | 4/1999 |
| WO | 2010/074141 | 7/2010 |

* cited by examiner

HEAT EXCHANGING STRUCTURE INCLUDING SOLAR HEAT CONVERTER

BACKGROUND OF THE INVENTION

1. Field of the Invention

The present invention relates to a heat exchanging structure of a solar heat exchanger.

2. Description of Related Art

A solar concentration apparatus used with a solar heat exchanger is disclosed in, for example, Japanese Unexamined Patent Application Publication No. H11-119105. This related art is a beam-down solar concentration apparatus that employs primary mirrors called heliostats. The heliostats reflect solar rays toward a secondary mirror installed at the top of a tower. The secondary mirror downwardly reflects the solar rays so that the reflected solar rays are concentrated at a point on the ground.

According to this related art, the downwardly reflected solar rays strike a light receiving plate on the ground, to heat the light receiving plate to 1000 degrees centigrade or higher.

SUMMARY OF THE INVENTION

The related art mentioned above directly heats the light receiving plate with solar rays to very high temperatures. If the high-temperature heat is effectively extracted through heat exchange from the light receiving plate, the heat will efficiently be used. In practice, however, the light receiving plate becomes too hot to make it directly contact with a heat exchanging fluid such as water or oil and there has been proposed no heat exchanging structure that is useful for the high-temperature heat receiving plate.

The present invention provides a heat exchanging structure of a solar heat exchanger, capable of safely extracting heat from a high-temperature light receiving plate.

According to an aspect of the present invention, the solar heat exchanger includes a heat-resistant container having an open top and containing a low-melting-point metal and a light receiving plate of carbon material floating on the low-melting-point metal so that the light receiving plate is irradiated with solar rays from above. The heat exchanging structure includes a housing of heat insulating material configured to accommodate the solar heat exchanger and a pipe configured to pass a heat exchanging fluid. The pipe is arranged in a space between the housing and the solar heat exchanger in such a way as not to touch the solar heat exchanger.

DESCRIPTION OF THE PREFERRED EMBODIMENT

Figure 2:
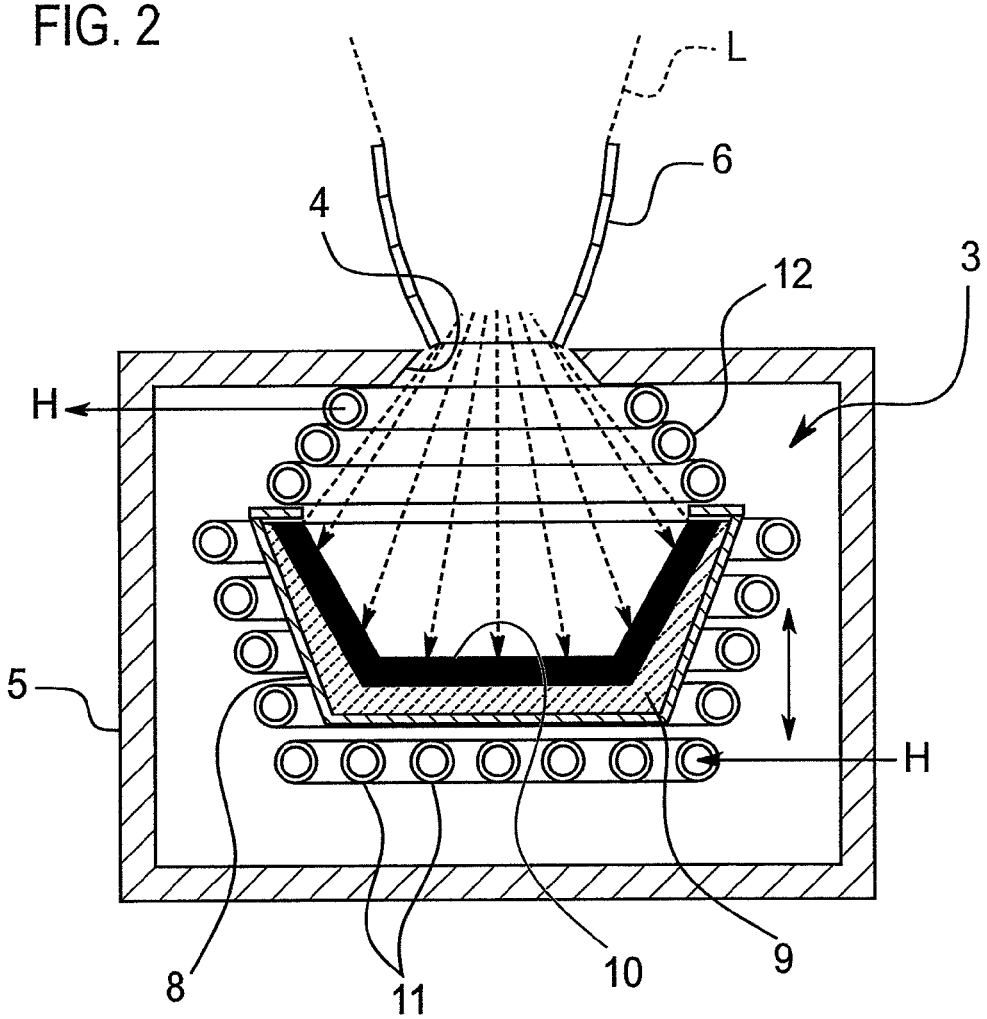
FIG. 2 is a sectional view illustrating the solar heat exchanger and heat exchanging structure.
Figure 3:
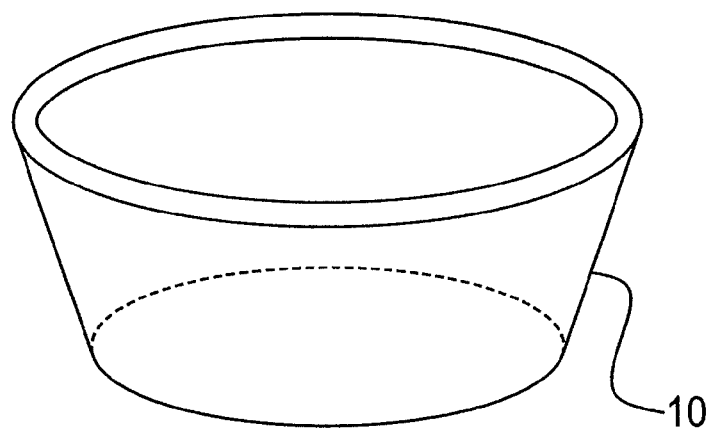
FIG. 3 is a perspective view illustrating a light receiving plate of the solar heat exchanger.

A heat exchanging structure of a solar heat exchanger according to an embodiment of the present invention will be explained in detail with reference to FIGS. 1 to 3.

Figure 1:
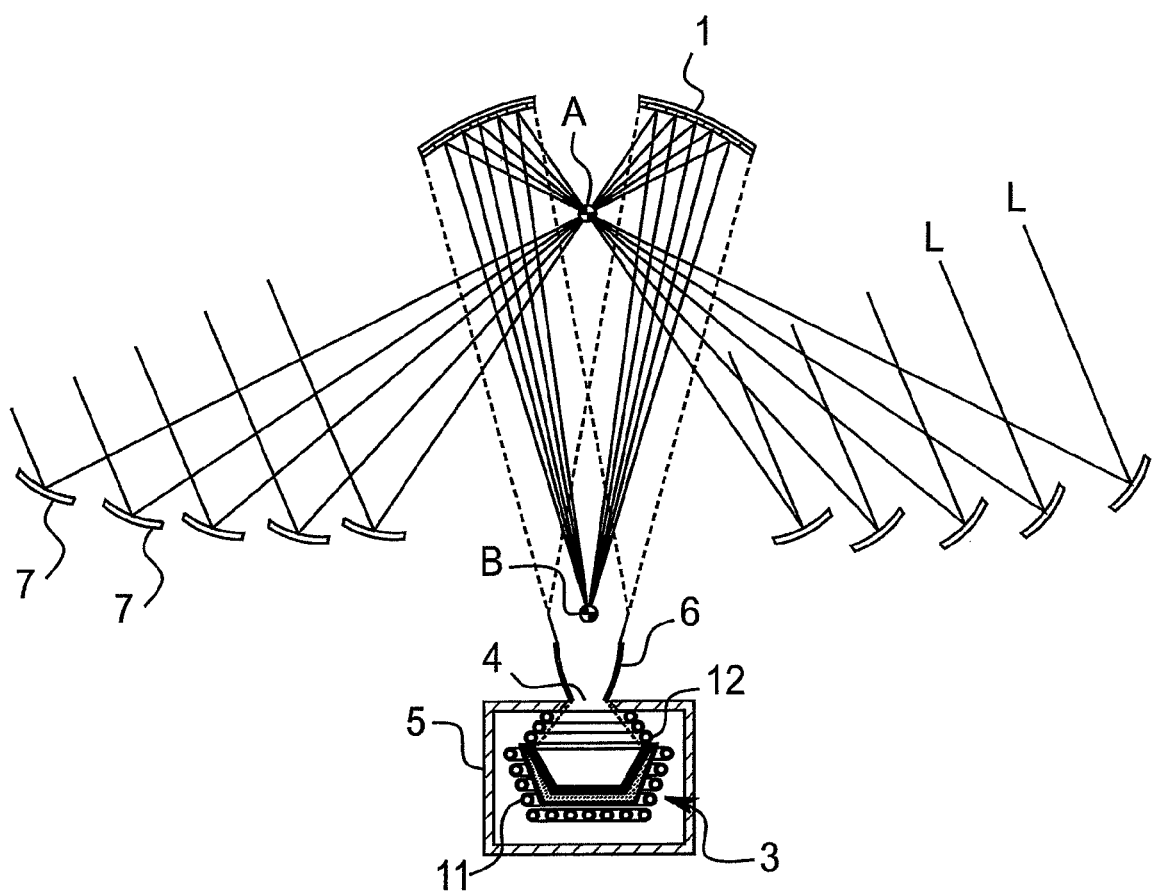
FIG. 1 is a general view illustrating a solar heat exchanger and a heat exchanging structure according to an embodiment of the present invention.

In FIG. 1, a secondary mirror 1 is an elliptical mirror and is installed at a predetermined height on a tower (not illustrated). The elliptical mirror 1 is downwardly oriented. A mirror surface of the elliptical mirror 1 is part of a spheroid. Below the spheroid in a long axis direction, a first focus A and a second focus B that are confocal are present. Arranged under the elliptical mirror 1 is a solar heat exchanger 3 (i.e., a solar heat converter) that converts solar rays L into thermal energy. The solar heat exchanger 3 is accommodated in a housing 5 that has a top opening 4 and is made of ALC (autoclaved lightweight concrete). The opening 4 of the housing 5 is provided with a collector mirror 6 having a tapered cylindrical shape. An inner face of the housing 5 may be coated with a reflective film to reflect outward thermal radiation.

On the ground around the solar heat exchanger 3, many heliostats 7 serving as primary mirrors are arranged to surround the elliptical mirror 1. Each of the heliostats 7 is controlled by a solar ray sensor (not illustrated) so that a solar beam L reflected by the heliostat 7 may pass through the first focus A. The solar beams L reflected by the heliostats 7 and passed through the first focus A are downwardly reflected by the elliptical mirror 1, are collected at the second focus B, are gathered by the collector mirror 6, and are received by the solar heat exchanger 3.

Inside the housing 5, a heat-resistant container 8 of heat-resistant metal is arranged with a space interposed between the housing 5 and the container 8. The container 8 has an open top and a tapered side wall that widens from a circular bottom toward the open top.

The heat-resistant container 8 holds tin 9 that is a low-melting-point metal. The tin 9 has a melting point of 232° C. and melts as is heated with solar beam. A light receiving plate 10 floats on the tin 9. The light receiving plate 10 is made of a black carbon material and is covered with a silicon carbide (SiC) film. The light receiving plate 10 is shaped into a container having an open top, similar to the container 8. According to the present embodiment, the container 8, tin 9, and light receiving plate 10 constitute the solar heat exchanger 3.

Around the heat-resistant container 8, a heat exchanging pipe 11 is arranged in a spiral shape. The pipe 11 is arranged not to touch the container 8. Namely, a clearance is secured between the pipe 11 and the container 8.

Another pipe 12 in a spiral shape is arranged above the solar heat exchanger 3. The pipe 12 is arranged in such a way as not to interfere with the solar beams L radiated from the collector mirror 6. The upper pipe 12 is connected to the lower pipe 11 through a flexible pipe (not illustrated). The lower pipe 11 is vertically movable relative to the heat-resistant container 8. The vertical movement of the lower pipe 11 results in changing the clearance between the lower pipe 11 and the container 8.

The pipe 11 passes oil H serving as a heat exchanging fluid and/or a heat carrier. The oil H has a heatproof temperature of about 400° C. If the temperature exceeds 400° C., the oil H changes its properties. When the temperature is lower than 400° C., as the oil H is heated the heat can be taken outside.

Operation of the solar heat exchanger 3 according to the present embodiment will be explained. Solar beams L hit the light receiving plate 10, which converts the solar beams L into heat. The light receiving plate 10 has a container-like shape with an open top, and therefore, has a large light receiving area compared with a flat plate, to effectively heat itself. The light receiving plate 10 is made of a carbon material coated with a silicon carbide film, and therefore, has a good light absorbing characteristic and heat resistant characteristic. The heat of the light receiving plate 10 is transferred to the tin 9, which becomes molten when the temperature thereof reaches the melting point thereof.

The molten tin 9 is present between the light receiving plate 10 and the heat-resistant container 8 and is in contact with both of them, to effectively transfer heat from the light receiving plate 10 to the container 8. Namely, the solar heat exchanger 3 including the light receiving plate 10, tin 9, and container 8 is not only a heat source of very high temperature but also a radiator to radiate heat around the same.

The radiant heat from the container 8 is a main heat source for the oil H passing through the pipe 11 and heats the oil H through the pipes 11 and 12. Since the oil H is heated with the radiant heat, the temperature of the oil H does not excessively increase, and therefore, the properties of the oil H never deteriorate.

The lower pipe 11, which is in the vicinity of the solar heat exchanger 3 and has a high heating efficiency due to the radiant heat, is vertically movable to adjust the clearance between the pipe 11 and the heat-resistant container 8. This results in adjusting the quantity of radiant heat applied to the pipe 11 and optimizing the temperature of oil H passing through the pipe 11.

According to the present embodiment, the light receiving plate 10 is made of a black carbon material coated with a silicon carbide film. Instead, the light receiving plate 10 may entirely be made of silicon carbide. According to the embodiment, the low-melting-point metal is tin. Instead, the low-melting-point metal may be lead or solder.

As mentioned above, the present invention makes the pipe for passing a heat carrier not to touch the solar heat exchanger 3 including the light receiving plate 10, so that the heat carrier in the pipe is heated with radiant heat from the solar heat exchanger 3. This configuration secures safety. The temperature of the solar heat exchanger 3 becomes very high, and therefore, the radiant heat therefrom can surely heat the heat carrier in the pipe.

According to the present invention, the light receiving plate 10 has a container-like shape having an open top, and therefore, has a large light receiving area to heat itself to higher temperatures compared with a flat light receiving plate.

According to the present invention, the pipe is vertically movable relative to the solar heat exchanger 3, to adjust a clearance between the pipe and the solar heat exchanger 3 and optimize the quantity of radiant heat acting on the pipe.

According to the present invention, the light receiving plate 10 is made of solid silicon carbide or a solid carbon material coated with a silicon carbide film, to realize a high solar beam absorbing efficiency and heat resistance.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A heat exchanging structure, comprising:
    a solar heat converter having a heat-resistant container provided with an open top, wherein the heat-resistant container contains a low-melting-point metal and a light receiving plate of carbon material floating on the low-melting-point metal so that the light receiving plate is irradiated with solar rays from above;
    a housing of heat insulating material that accommodates the solar heat converter; and
    a pipe configured to pass a heat carrier, the pipe being arranged in a spiral shape and in a space between the housing and the solar heat converter, and the pipe surrounding the heat-resistant container so as not to contact the solar heat converter, the pipe having an adjustable position relative to the heat-resistant container.

2. The heat exchanging structure of claim 1, wherein the light receiving plate has a container-like shape having an open top.

3. The heat exchanging structure of claim 1, wherein the pipe is configured to be movable vertically relative to the heat-resistant container.

4. The heat exchanging structure of claim 1, wherein the light receiving plate is made of solid silicon carbide or a solid carbon material entirely coated with a silicon carbide film.

\* \* \* \* \*